(12) United States Patent
Sawada

(10) Patent No.: US 6,807,320 B1
(45) Date of Patent: Oct. 19, 2004

(54) IMAGE PROCESSING METHOD AND IMAGE FORMING APPARATUS

(75) Inventor: Kouichi Sawada, Tokyo (JP)

(73) Assignee: Konica Corporation, Tokyo (JP)

( * ) Notice: Subject to any disclaimer, the term of this patent is extended or adjusted under 35 U.S.C. 154(b) by 818 days.

(21) Appl. No.: 09/669,945

(22) Filed: Sep. 26, 2000

(30) Foreign Application Priority Data

Sep. 29, 1999 (JP) ............................................ 11-276550

(51) Int. Cl.$^7$ ............................. G06K 9/36; G06K 1/00
(52) U.S. Cl. ........................ 382/289; 382/296; 358/1.16
(58) Field of Search ................................ 382/296, 295, 382/294, 297, 305, 289, 290, 318, 323; 358/1.16, 2.1, 505, 3.01, 521; 345/649, 651

(56) References Cited

U.S. PATENT DOCUMENTS

| | | | | |
|---|---|---|---|---|
| 4,686,577 A | * | 8/1987 | Arimoto ..................... | 358/449 |
| 4,878,124 A | * | 10/1989 | Tsujimoto et al. .......... | 358/443 |
| 5,206,744 A | * | 4/1993 | Kamada et al. ............. | 358/488 |
| 5,373,371 A | * | 12/1994 | Masui ........................ | 358/444 |
| 6,034,784 A | * | 3/2000 | Gatto et al. ................. | 358/1.18 |
| 6,064,778 A | * | 5/2000 | Pasco et al. ................. | 382/289 |
| 6,084,988 A | * | 7/2000 | Kanno et al. ............... | 382/289 |
| 6,340,984 B1 | * | 1/2002 | Ui et al. ..................... | 347/139 |
| 6,647,155 B2 | * | 11/2003 | Washio et al. .............. | 382/293 |

FOREIGN PATENT DOCUMENTS

JP            10-191026        7/1998

* cited by examiner

*Primary Examiner*—Kanji Patel
(74) *Attorney, Agent, or Firm*—Frishauf, Holtz, Goodman & Chick, P.C.

(57) ABSTRACT

An image processing method includes the steps of: detecting an inclination of image data; storing the image data for one line into a first memory; changing a reading timing when the image data is read from the first memory, according to the detected inclination, whereby correcting a shift in a main scanning direction; storing the image data for not smaller than 2 lines into a second memory; and changing a line position in a sub-scanning direction when the image data is read from the second memory, according to the detected inclination, whereby correcting a shift in the sub-scanning direction.

3 Claims, 8 Drawing Sheets

IMAGE PROCESSING METHOD AND IMAGE FORMING APPARATUS

BACKGROUND OF THE INVENTION

The present invention relates to an image processing method and image forming apparatus, and specifically to an image processing method and image forming apparatus by which the image can be formed while an inclination of an image is being quickly corrected.

When an inclination is generated in the image data obtained by reading a document by a scanner, a method by which the image data is stored in a memory and the inclination correction processing is carried out at the time of reading out, is applied. For example, the description relating to this kind of correction processing is also disclosed in Japanese Tokkaihei No. 10-191026.

In the above inclination correction method, because it is necessary that whole image data is written in the memory once, a time to write in the memory and to read from the memory is necessary at the time of the inclination correction.

That is, for the image data obtained by reading the document, it is necessary that writing and reading for one image area are carried out, and there is a problem that the image formation can not be attained in real time while reading out the image data.

Further, in this inclination correction method, at least a memory for one image area is necessary, and there is a problem that the large capacity memory is necessary for storing the image data of the read out document.

SUMMARY OF THE INVENTION

Accordingly, the object of the present invention is to realize an image processing method and an image forming apparatus which do not need a large capacity memory for the inclination correction, and can correct the inclination in a short time.

That is, the present invention to solve the above problem is as follows.

The present invention is an image processing method, which comprising steps of: an inclination detecting step to detect the inclination of the image data; a main scanning correction step to store the image data for one line, and by changing the read out timing when the image data is read out, corresponding to the detected inclination, to correct a shift in the main scanning direction; and a sub-scanning correction step to store the image data for n lines (n is an integer not smaller than 2), and by changing the line position in the sub-scanning direction when the image data is read out, corresponding to the detected inclination, to correct a shift in the sub-scanning direction.

Further, the present invention is an image processing method, which comprising steps of: an inclination detecting step to detect the inclination of the image data; a main scanning correction step by which the writing timing when the image data for one line is stored, is changed corresponding to the detected inclination, and by reading out the image data in a normal timing, a shift in the main scanning direction is corrected; and a sub-scanning correction step by which a line position in the sub-scanning direction when the image data is written into the memory means, is changed corresponding to the detected inclination, for the image data not smaller than 2 lines, and the image data is read out at a normal line position and a shift in the sub-scanning direction is corrected.

Further, the present invention is an image forming apparatus, which comprising: an inclination detecting means for detecting an inclination of the image data which is a set of line-like pixels; a main scanning correction means for storing the image data for one line, and for correcting a shift in the main scanning direction by changing a reading out timing when the image data is read out, corresponding to the detected inclination; and a sub-scanning correction means for storing the image data for n lines (n is an integer not smaller than 2), and for correcting a shift in the sub-scanning direction by changing the line position in the sub-scanning direction when the image data is read out, corresponding to the detected inclination.

Further, the present invention is an image forming apparatus, which comprising: an inclination detecting means for detecting an inclination of the image data which is a set of line-like pixels; a main scanning correction means for changing the writing timing when the image data for one line is stored, corresponding to the detected inclination, and by reading out the image data at a normal timing, for correcting a shift in the main scanning direction; and a sub-scanning correction means for changing a line position in the sub-scanning direction when the image data is written into the memory means, corresponding to the detected inclination, for the image data for n lines (n is an integer not smaller than 2), and for reading out the image data at a normal line position and for correcting a shift in the sub-scanning direction.

Incidentally, it is preferable that, in the main scanning correction, correction is conducted at intervals of every m lines (m is an integer not smaller than 1), and in the sub-scanning correction, correction is conducted at intervals of every lines which is not smaller than 2, and not more than n (n is an integer not smaller than 2).

In the present invention, the inclination of the image data is detected, and by changing the reading out timing when the image data for m lines is read out (or writing timing when the image data is written) corresponding to the inclination, a shift in the main scanning direction is corrected, and the image data for not smaller than 2 lines, is stored, and by changing the line position in the sub-scanning direction when the image data is read out, (or the line position in the sub-scanning direction when the image data is written) corresponding to the detected inclination, a shift in the sub-scanning direction is corrected.

In this case, it is preferable that, after the main scanning correction means conducts the correction in the main scanning correction means, the sub-scanning correction means conducts the correction in the sub-scanning direction.

Herein, because a memory for one line for the main scanning direction, and a memory for n (n is an integer not smaller than 2) lines for the sub-scanning direction are necessary, a line memory for (1+n) lines is sufficient. Further, basically, the processing is for each line, and the inclination correction can be conducted while reading is being conducted, therefore, the inclination correcting processing can be conducted in almost real time.

As the result, the image processing method and the image forming apparatus by which a large capacity memory is not necessary for the inclination correction, and the inclination correction can be conducted in a short time, can be realized.

Incidentally, it is preferable that the sub-scanning correction means changes the number of lines which is written in the sub-scanning correction means corresponding to the number of gradations of the image data, for example, such as 8-line correction in the one bit gradation, and 4-line correction in the 2-bit gradation. As described above, for the correction of the inclination in the sub-scanning direction, because the number of lines when n lines are written in the sub-scanning correction memory, is controlled corresponding to the number of gradations of the image data, thereby, the sub-scanning correction memory can be effectively used.

Further, it is preferable that the correction of the main scanning direction and correction of the sub-scanning direction are conducted by the offset movement from the position at which the document is read out. When the inclination correction of the image data accompanied by such the offset correction is conducted, the setting of the effective image area in which the actual image formation is conducted when the inclination correction is conducted, can be optimum, and the correction of the image can be properly conducted.

Further, when the inclination amount from the inclination detecting means exceeds the maximum correction amount of the main scanning correction means or the sub-scanning correction means, it is desirable that the maximum correction amount is corrected as the inclination amount.

According to this, the inclination correction can be conducted without the operation being interrupted. Incidentally, when the detected inclination amount exceeds the inclination amount allowable for the image quality (a slight inclination amount within an amount in which the inclination is visually sensed) from that, in addition to the maximum correction amount, it is desirable to display that the inclination of the document exceeds the correction amount.

Furthermore, the further preferable structures are as follows.

(a) An image reading apparatus, which having the structures of: an image reading device for reading out an image of a document; an image input device for receiving the image data read out by the image, reading device; a detecting device for detecting an inclination of the image data which is a set of line-like pixels; a main scanning correction device for storing the image data for one line in a first memory, and for correcting a shift in the main scanning direction, by changing the reading out timing when the image data is read out from the first memory, corresponding to the inclination detected by the detecting device; a sub-scanning correction device for storing the image data for n lines (n is an integer not smaller than 2) in a second memory, and for correcting a shift in the sub-scanning direction, by changing a line position in the sub-scanning direction when the image data is read out from the second memory, corresponding to the inclination detected by the detecting device; an image storing device for storing the image data corrected by the main scanning correction device and the sub-scanning correction device; and a controller for controlling operations of the image input device, detecting device, main scanning correction device, and sub-scanning correction device.

(b) An image reading apparatus, which having the following structures of: an image reading device for reading out an image of a document; an image input device for receiving the image data read out by the image reading device; a detecting device for detecting an inclination of the image data which is a set of line-like pixels; a main scanning correction device for changing the writing timing when the image data for one line is stored in the first memory, corresponding to the inclination detected by the detecting device, and for correcting a shift in the main scanning direction by reading out the image data in a normal timing from the first memory; a sub-scanning correction device for changing the line position in the sub-scanning direction when the image data for n (n is an integer not smaller than 2) lines is written into a second memory, corresponding to the inclination detected by the detecting device, and for correcting a shift in the sub-scanning direction by reading out the image data at a normal line position; an image storing device for storing the image data corrected by the main scanning correction device and the sub-scanning correction device; and a controller for controlling the operations of the image input device, the detecting device, the main scanning correction device, and the sub-scanning correction device.

(c) Further, an image forming apparatus, which having the structures of: an image input device for receiving the image data; a detecting device for detecting an inclination of the image data which is a set of line-like pixels; a main scanning correction device for storing the image data for one line in a first memory and for correcting a shift in the main scanning direction, by changing the reading out timing when the image data is read out, corresponding to the inclination detected by the detecting device; a sub-scanning correction device for storing the image data for n (n is an integer not smaller than 2) lines in a second memory, and for correcting a shift in the sub-scanning direction, by changing the line position in the sub-scanning direction when the image data is read out, corresponding to the inclination detected by the detecting device; an image storing device for storing the image data corrected by the main scanning correction device and the sub-scanning correction device; a controller for controlling the operations of the image input device, the detecting device, the main scanning correction device, and the sub-scanning correction device; and an image forming device for forming the image based on the image data stored in the image storing device.

(d) Furthermore, an image forming apparatus, which having the structures of: an image input device for receiving the image data; a detecting device for detecting an inclination of the image data which is a set of line-like pixels; a main scanning correction device for changing the writing timing when the image data for one line is stored in a first memory, corresponding to the inclination detected by the detecting device, and for correcting a shift in the main scanning direction by reading out the image data in a normal timing; a sub-scanning correction device for changing the line position in the sub-scanning direction when the image data for the image data for n (n is an integer not smaller than 2) lines is written into a second memory, corresponding to the inclination detected by the detecting device, and for correcting a shift in the sub-scanning direction by reading out the image data at a normal line position; an image storing device for storing the image data corrected by the main scanning correction device and the sub-scanning correction device; a controller for controls the operations of the image input device, the detecting device, the main scanning correction device, and the sub-scanning correction device; and an image forming device for forming the image based on the image data stored in the image storing device.

The first memory and the second memory set forth in the present invention may be included in the same and common memory or used as respectively independent memories. In the case that the same and common memory is applied, it is possible to reduce the number of memories, on the contrary, in the case that the independent memories are applied, it can be easier to conduct the inclination correction processing.

DETAILED DESCRIPTION OF THE PREFERRED EMBODIMENTS

Figure 1:
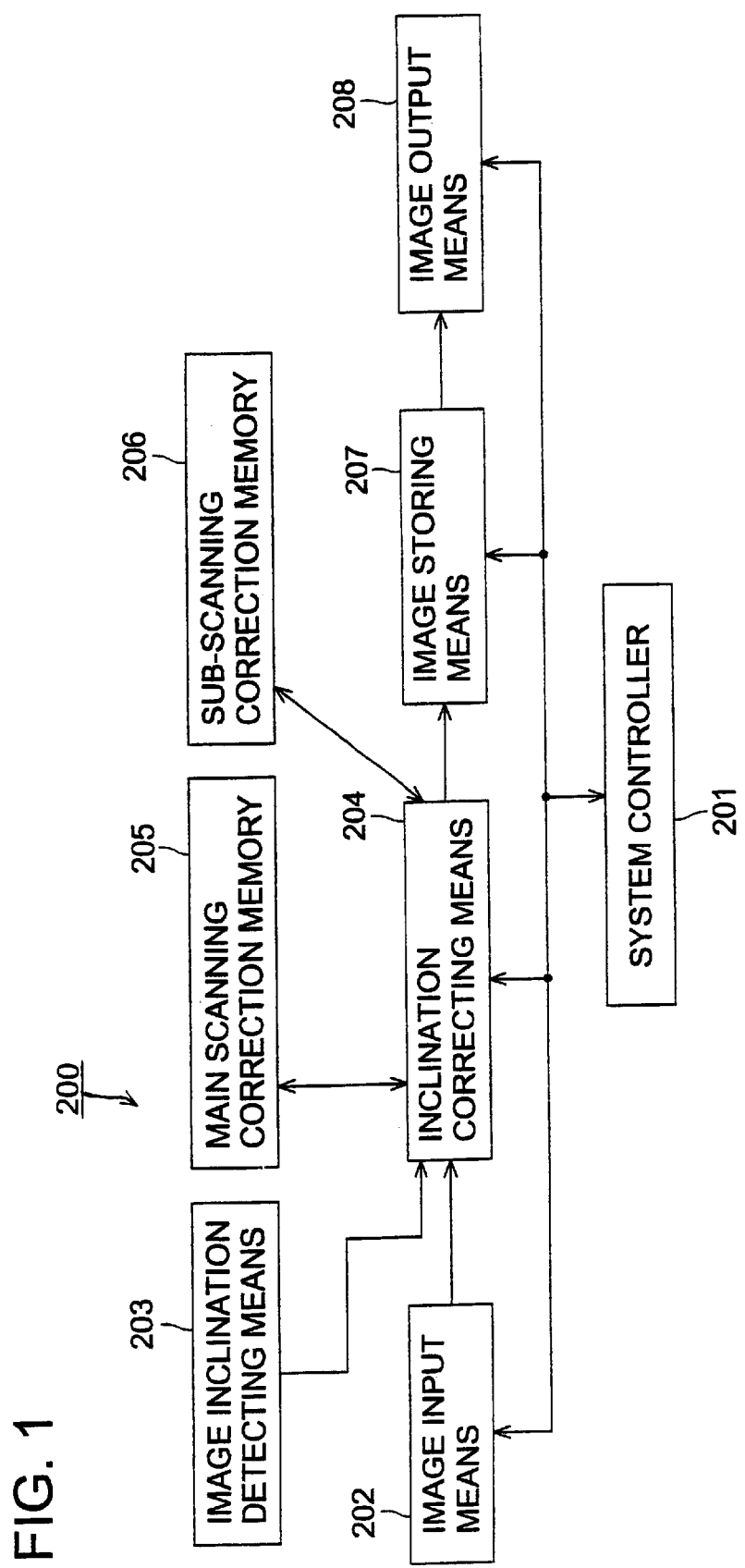
FIG. 1 is a functional block diagram showing the electric structure of an image forming apparatus of the embodiment of the present invention.

Referring to the drawings, the embodiment of the present invention will be detailed below. FIG. 1 is a block diagram showing the electric structure of an image forming apparatus of the embodiment of the present invention, and FIG. 2 is a sectional side view showing the mechanical structure of the image forming apparatus of the embodiment of the present invention.

Initially, referring to FIG. 2, the whole of the image forming apparatus will be described. Incidentally, in the present embodiment, as an image forming apparatus, a copier which carries out the document reading and image formation, is used for explanation.

Figure 2:
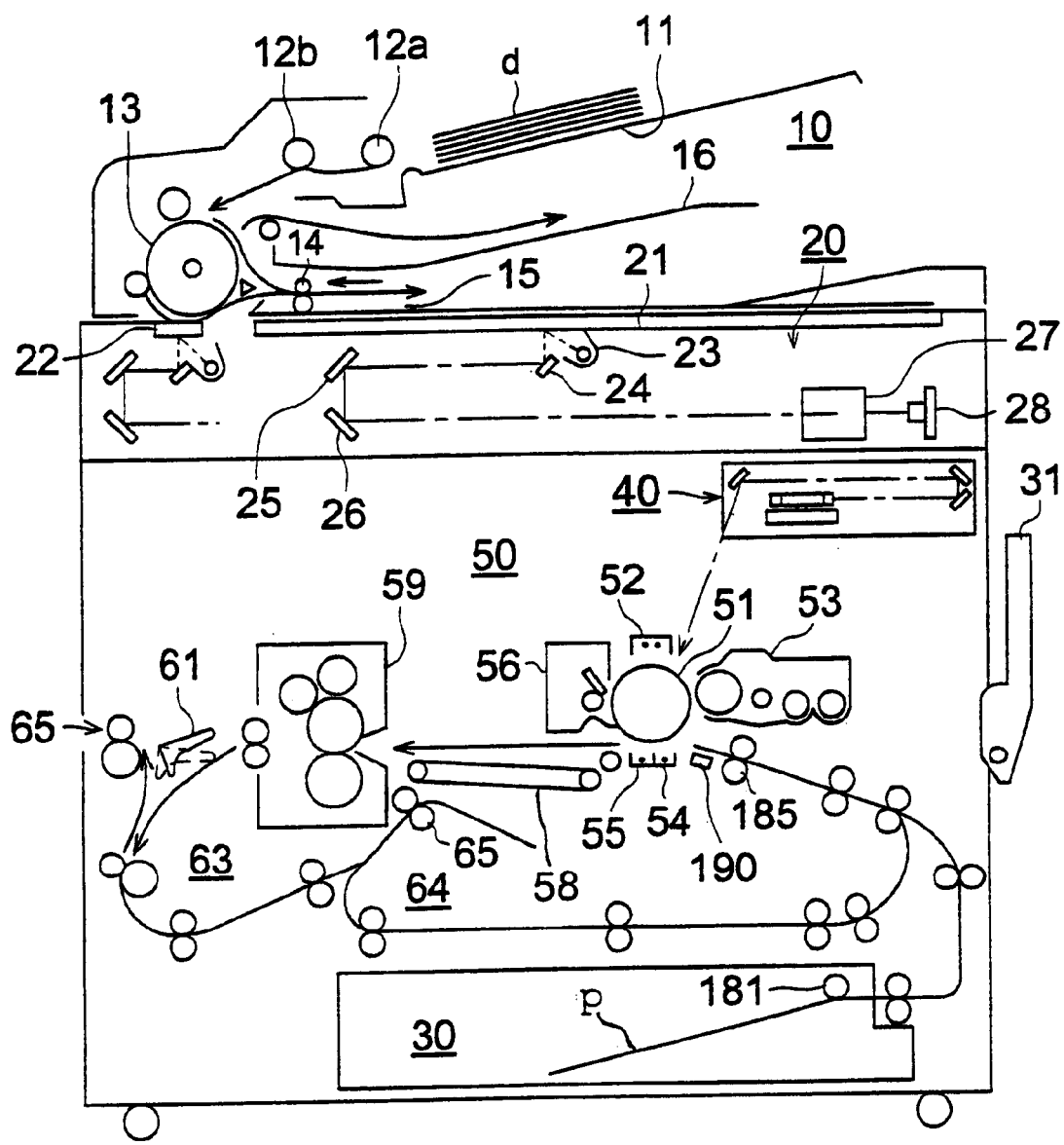
FIG. 2 is a structural view showing the mechanical structure of the image forming apparatus of the embodiment of the present invention.

Incidentally, in FIG. 2, an apparatus which can carry out the two-side reading and image formation, is shown, however, the present invention is not limited to this, but can also be applied to an apparatus which carries out only single side reading and image formation.

In FIG. 2, a plurality of document sheets d whose first page surface is facing upward, are placed on a document platen 11 of an ADF 10 which can feed the document. The first sheet of the document carried through a roller 12a and roller 12b is rotationally carried through a roller 13.

Next, the document surface of the document d is irradiated by a light source 23, and the reflected light forms an image on the light receiving surface of a CCD 28 which is a photoelectric conversion means, through mirrors 24, 25, and 26 and an image forming optical system 27. Herein, an image reading section 20 is structured by the an optical system having the light source 23, mirrors 24, 25, and 26, image forming optical system 27 and CCD 28, and an optical system drive means, not shown.

In FIG. 2, when the document d is placed on the platen glass 21 with the reading surface facing downward, the optical system reads out the document by scanning along the platen glass 21.

Further, when the document d is automatically fed, and rotated around the roller 13, the reading out is carried out under the condition that the light source 23 and the mirror 24 are fixed under the second platen glass 22. Then, the image data of the read out document d is sent from the CCD 28 to an image processing section 200.

Incidentally, in the case where the document d is automatically fed by the ADF 10, when the first page of the document d is read out, then, winding operation is carried out again by using the roller 13 through a reverse roller 14, and the image of the rear side of the document is read out by the image reading section 20, and sent to the image processing section 200.

As described above, the document d whose front side image and rear side image are read, is reversed by the reverse roller 14 again, and stacked onto the delivery sheet tray 16 in the condition that the front side faces downward. As described above, the image data read out by the image reading section 20, is compressed and stored in the image memory, after the predetermined image processing is carried out in the image processing section 200.

On the one hand, a transfer sheet p is fed from a sheet feed cassette 30 in which the transfer sheet is loaded, by a conveyance roller 181, and fed to an image forming section 50. Further, a transfer sheet may be fed from a manual feeding tray 31 by a conveyance roller and fed to the image forming section 50.

Then, after the transfer sheet p fed to the image forming section 50 is in timed relationship with a register roller 185 near its entry, the transfer sheet p approaches a photoreceptor drum 51, which is an image carrier. That is, the first conveyance path from the sheet feed cassette 30 to the register roller 185, and the second conveyance path from the hand feeding tray 31 to the register roller 185, are provided.

Further, the leading edge of the transfer sheet p in timed relationship with the register roller 185 is detected by a leading edge detection sensor 190. The image data is inputted from the image processing section to the image writing section 40, and the laser light corresponding to the image data is irradiated onto the photoreceptor drum 51 from a laser diode in the image writing section 40, and an electrostatic latent image is formed. The electrostatic latent image is developed by a developing section 53, thereby, a toner image is formed on the photoreceptor drum 51.

The toner image is transferred onto the transfer sheet p by a transfer section 54 provided in the lower portion of the photoreceptor drum 51. Then, the transfer sheet p in contact with the photoreceptor drum 51 is separated by a separation section 55. The transfer sheet separated from the photoreceptor drum 51 enters a fixing section 59 through a conveyance mechanism 58, and the toner image is fixed by the heat and pressure. As described above, the image is formed on the transfer sheet p.

Incidentally, when the reversal sheet re-feeding is necessary at the time of two-sided image formation, the transfer sheet p on which the toner image is fixed, is conveyed to the lower side through a guide 61, and enters a reversal section 63. Next, the transfer sheet p entered the reversal section 63 is fed again by the reversing roller, and sent to the image forming section 50 again through the reversal conveyance path 64. In the image forming section 50 in which the image formation of one side of the document d is completed, the toner adhered onto the photoreceptor drum 51 is removed by a cleaning section 56, and the photoreceptor drum 51 is ready for the next image formation.

In this situation, the other side of the transfer sheet p (the surface on which the image formation is not carried out) is conveyed into the image forming section 50, and the image is formed. The transfer sheet p separated from the photoreceptor drum 51 by the separation section 55 enters the fixing section 59 again through the conveyance mechanism 58, and is fixed. In this manner, the transfer sheet p on whose rear side and front side the image formation is completed, or the transfer sheet p on whose one side the image formation is completed, is delivered to the outside of the apparatus.

Herein, referring to the block diagram in FIG. 1, the structure of the image processing section 200, which is a main portion of the present embodiment, will be described.

In this FIG. 1, numeral 201 is a system controller which controls each section of the image processing apparatus, and includes a CPU as a control means for conducting the whole control when the inclination correction processing in real time in the present embodiment is conducted.

Numeral 202 is an image input means for receiving the image data from the image reading section 20 or the outside, numeral 203 is a document inclination detecting means for detecting the inclination of the document by the sensor housed in the image reading section 20, numeral 204 is an image inclination correction means for conducting the inclination correction processing corresponding to the detected inclination, numeral 205 is a main scanning correction memory for storing the image data for one line, and numeral 206 is a sub-scanning correction memory for storing the image data for n lines (n is an integer not smaller than 2).

Numeral 207 is an image memory means for storing the image data which is inclination correction processed, and numeral 208 is an image output means for forming and outputting an image based on the image data stored by the image memory means 207.

Figure 3:
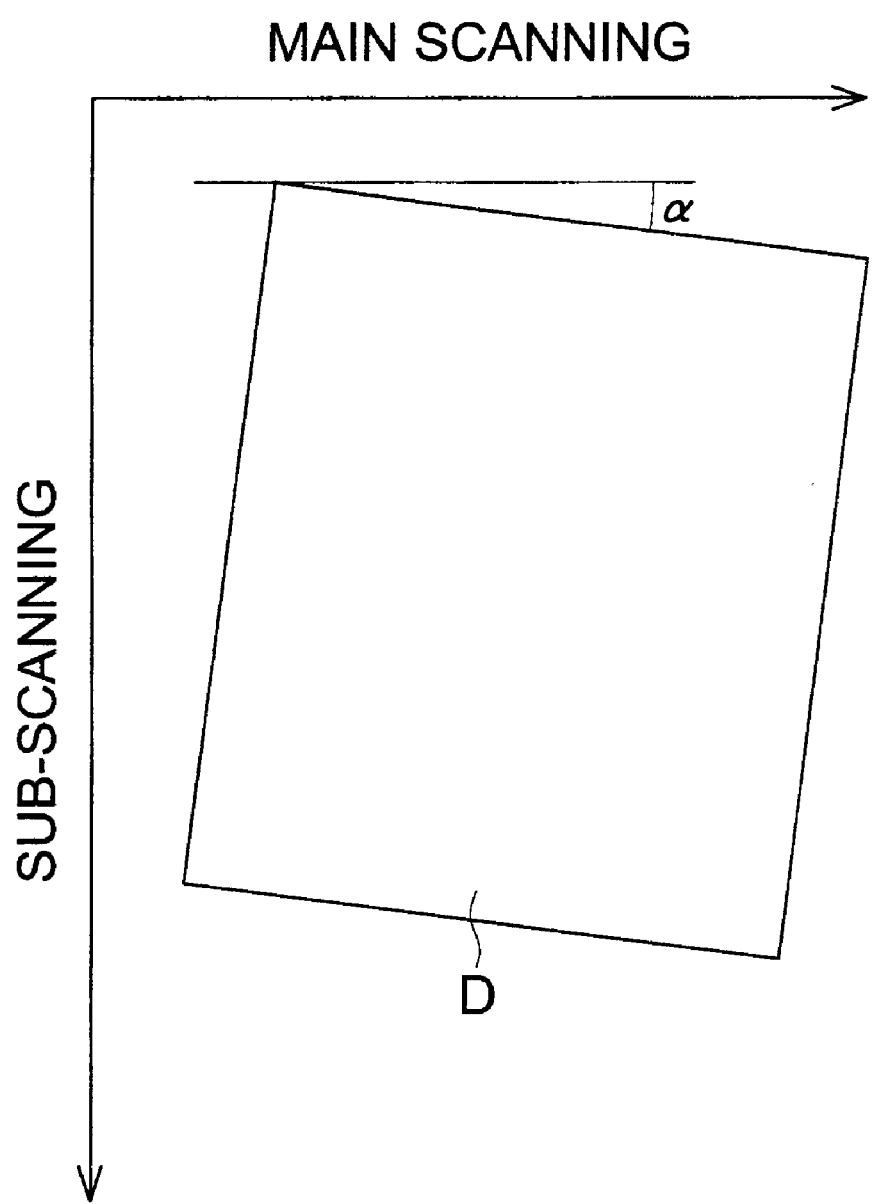
FIG. 3 is an illustration showing a condition of the inclination of a document processed by the image forming apparatus of the embodiment of the present invention.

Incidentally, when the image is outputted in the real time processing, the image memory means 207 is omitted, or the through-pass processing is conducted so that the image data passes through the image memory means 207. FIG. 3 shows an example of the inclination of the document D, and herein, an angle a formed between a side which should originally coincide with the main scanning direction, and the main scanning direction, is an angle showing the inclination. Incidentally, this α is detected by the document inclination detecting means 203.

Figure 4:
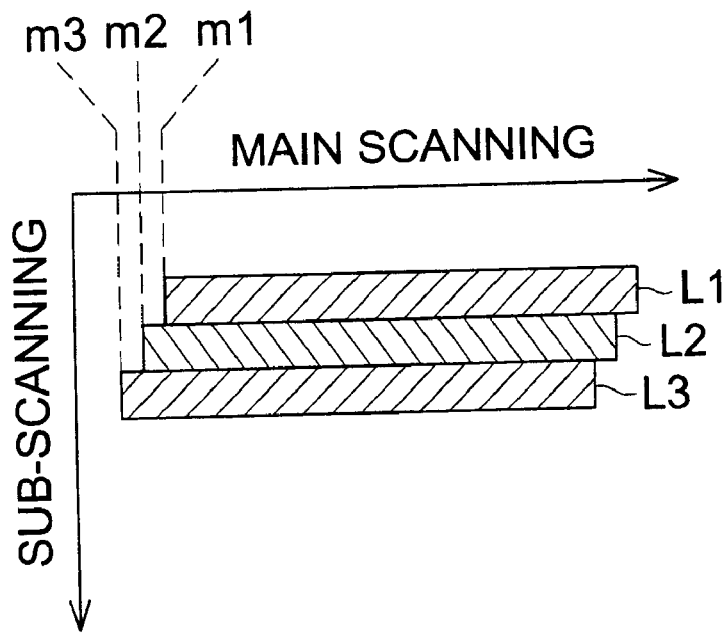
FIGS. 4(a) and 4(b) are illustrations showing a condition of the inclination correction in the main scanning direction of the embodiment of the present invention.
Figure 4:
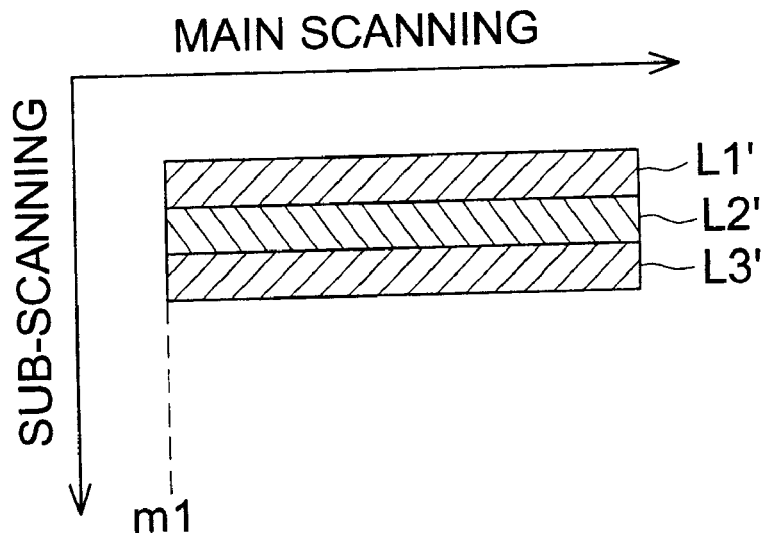

FIGS. 4(a) and 4(b) are illustrations showing a condition that the inclination in the main scanning direction is corrected. Herein, the hatched portion is a set of the line-like pixels (line image), and FIG. 4(a) shows the inclined condition in the main scanning direction before the correction, and FIG. 4(b) shows a condition after the correction in the main scanning direction.

Incidentally, in FIG. 4(a), three line images L1–L3 are shown. In this condition, the main scanning start points m1, m2, and m3 do not coincide with each other, and the inclination is generated. Therefore, after the line image is written from the inclination correction means 204 into the main scanning correction memory 205, a timing at which the inclination correction means 204 reads out the line image from the main scanning correction memory 205, is shifted.

Herein, it is described that a timing of reading out is shifted after the writing is carried out, however, also in the case where a timing is shifted at the time of writing, and reading out is carried out in a normal timing, the same result can be obtained.

In the case shown in FIGS. 4(a) and 4(b), in the line image L1, the writing is carried out in a timing of m1, and the reading is carried out in the timing of m1. Further, in the line image L2, the writing is carried out in a timing of m2, and the reading is carried out in the timing of m1. In the line image L3, the writing is carried out in a timing of m3, and the reading is carried out in the timing of m1.

According to this, in the read out line images L1', L2', and L3', the start points coincide with each other when the main scanning start point m1 is the reference position, and the inclination in the main scanning direction of the document is corrected.

Incidentally, for the inclination correction in the main scanning direction, the correction may be conducted for each line. In such the case, the second line and the subsequent line may be made to coincide with the main scanning start point of the first line.

Figure 5:
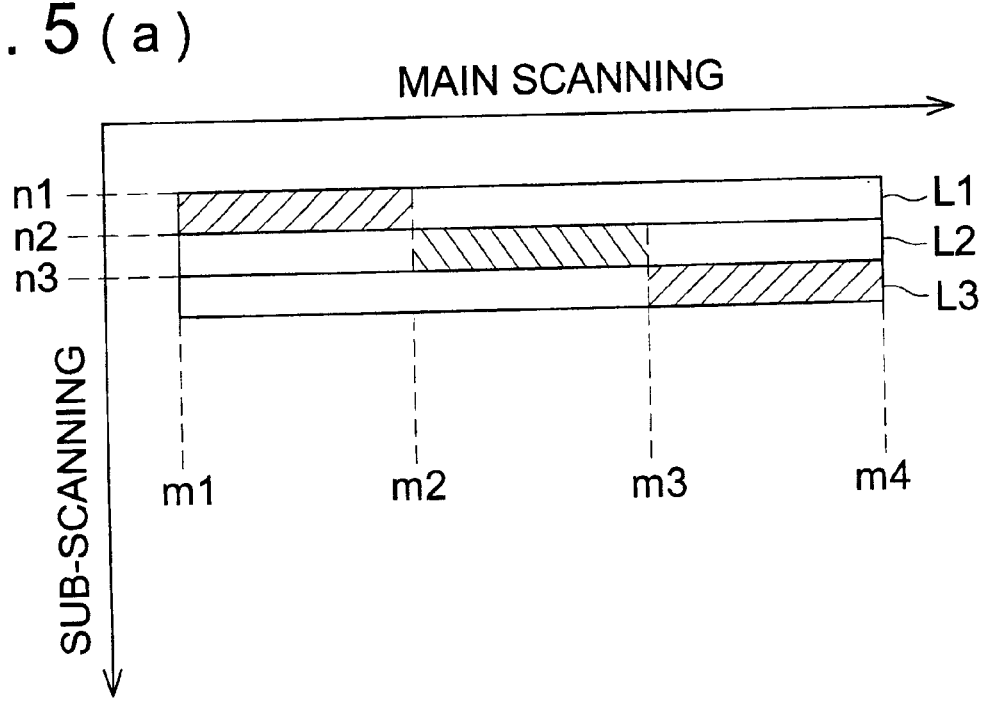
FIGS. 5(a) and 5(b) are illustrations showing a condition of the inclination correction in the sub-scanning direction of the embodiment of the present invention.
Figure 5:
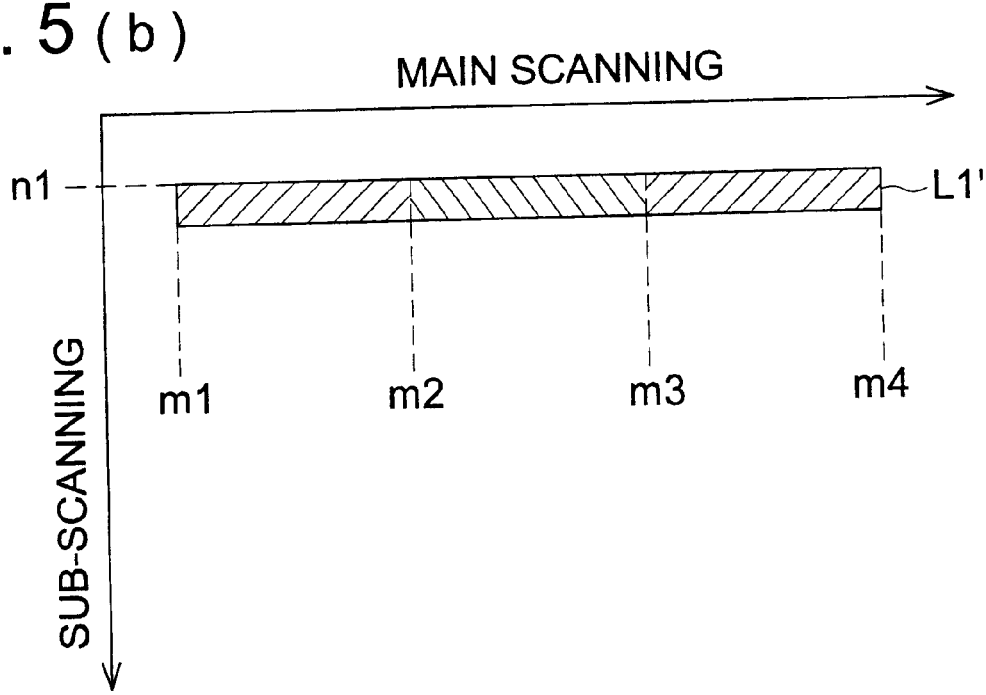

FIGS. 5(a) and 5(b) are illustrations showing conditions that the inclination correction in the sub-scanning direction is conducted. Herein, L1–L3 are a set (line images) of line-like pixels, and a hatched portion is a correction objective portion.

FIG. 5(a) shows a inclined condition in the sub-scanning direction before the correction, and FIG. 5(b) shows a condition after the correction in the sub-scanning direction. Incidentally, in FIG. 5(a), three line images L1–L3 are shown. In this condition, because line images which are originally the same, are inclined and shifted as shown in FIG. 3, the sub-scanning start points n1, n2, and n3 do not coincide with each other, and the inclination is generated.

Accordingly, after the line images are written from the inclination correction means 204 into the sub-scanning correction memory 206, a reading out area and a timing when the inclination correction means 204 reads out the line image from the sub-scanning correction memory 206, are shifted.

Herein, in order to correct a shift in the sub-scanning direction by dividing the line image into three, the capacity for three lines is provided in the sub-scanning correction memory 206. That is, when the line image is divided into n at maximum, the capacity may be for n lines. Incidentally, herein, n is an integer not smaller than 2.

In the cases shown in FIGS. 5(a) and 5(b), the line image L1 is written in a timing of the main scanning m1, and sub-scanning n1, the line image L2 is written in a timing of the main scanning m1, and sub-scanning n2, and the line image L3 is written in a timing of the main scanning m1, and sub-scanning n3. In this manner, initially, the line images for three lines are stored.

Then, in the case of the sub-scanning direction n1 and the main scanning direction m1–m2, the left hatched portion of L1 is read out at the start timing of n1·m1, in the case of the sub-scanning direction n2 and the main scanning direction m2–m3, the central hatched portion of L2 is read out at the start timing of n1·m2, and in the case of the sub-scanning direction n3 and the main scanning direction m3–m4, the right hatched portion of L3 is read out at the start timing of n1·m3.

According to this, the read out line image L1' coincides with each other using the sub-scanning start point n1 as the reference position, and it comes to a condition that the inclination in the sub-scanning direction of the document is corrected.

Incidentally, for the inclination correction in the sub-scanning direction, the correction may be carried out for every lines which is not smaller than 2 and not more than n. In this case, the correction may be conducted in such a manner that the n2 lines and subsequent are adjusted to the sub-scanning start point of the first line n1.

Then, in succession to the operations as described above, when the correction is conducted on the line images L2–L4, the line image L2' on which the correction in the sub-scanning direction is conducted, is obtained. Hereinafter, by repeating such the operation in the order, the correction for all the line images is conducted.

Herein, it is described that the timing of reading out is shifted, however, when the timing of the writing is shifted, and reading out is conducted in a normal timing, the same result can also be obtained.

As described above, the line image on which the correction in the main scanning direction and sub-scanning direction is conducted, is stored in the image memory means 207, and it is image formed by the image output means 208 and the print is outputted. Incidentally, in the case of the real time processing, the storing into the memory is not conducted and the output is conducted.

Incidentally, because the present embodiment is for the processing of the line image, the document reading and the inclination correction processing can be conducted in parallel.

That is, in contrast to a fact in which, in the conventional processing, the inclination correction can not be conducted when the reading out for one image area (for example, about 4000 lines) and the memory writing have not completed, in the present embodiment, when the image data for (1+n) lines is generated by the reading out, the inclination correction processing can be conducted in parallel. As the result, the inclination correction can be conducted in almost real time. Accordingly, the inclination correction can be conducted without keeping the user waiting.

Further, the memory necessary for the inclination correction can be managed with the line memory for (1+n) lines. Incidentally, n is determined corresponding to the maximum shift amount in the sub-scanning direction and the image formation density, however, as compared to the conventional case in which the frame memory is required, the memory capacity can be reduced to a one to several tens.

As the result, the image processing method and the image forming apparatus in which the large capacity memory for the inclination correction is not necessary, and the inclination correction can be conducted in a short time, can be realized.

Figure 6:
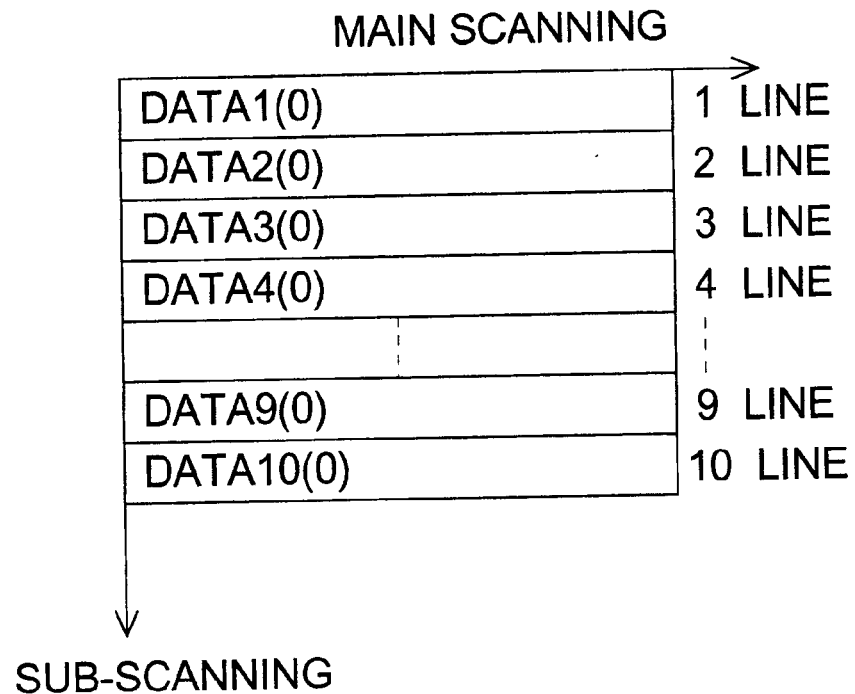
FIGS. 6(a) and 6(b) are illustrations showing a condition that the number of lines when the image data is written into a sub-scanning correction memory, is controlled corresponding to the number of gradations of the image data, in the correction of inclination in the sub-scanning direction of the embodiment of the present invention.
Figure 6:
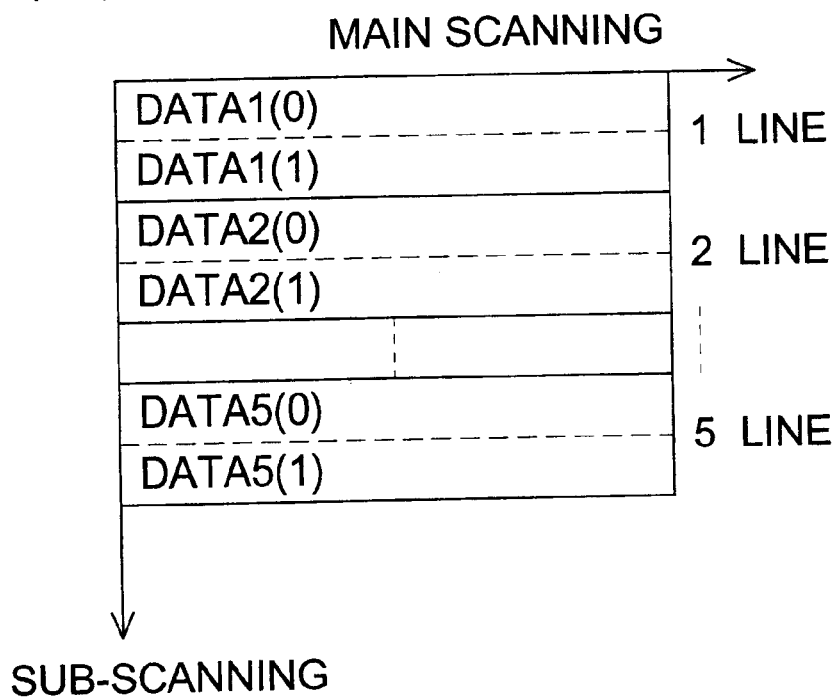

FIGS. 6(a) and 6(b) relate to the inclination correction in the sub-scanning direction described in FIGS. 5(a) and 5(b), and are illustrations showing the condition that the number of lines when n lines are written into the sub-scanning correction memory 206, is controlled corresponding to the number of gradations of the image data.

Herein, FIG. 6(a) shows the memory structure when the capacity of the sub-scanning correction memory 206 is for 1 bit×10 lines, and the gradations of the image data is 1 bit. In this case, DATA 1 (0) which is the first line image data, DATA 2 (0) which is the second line image data, DATA 3 (0) which is the third line image, . . . , and DATA 10 (0) which is the tenth line image data, are successively written. Then, when these 10 line image data are read out from the sub-scanning correction memory 206, by controlling the read out start position in the sub-scanning direction or the read out timing, the inclination in the sub-scanning direction of the image is corrected as described above.

Further, FIG. 6(b) shows the memory structure when the capacity of the sub-scanning correction memory 206 is for 1 bit×10 lines, and the gradations of the image data is 2 bits. In this case, DATA 1 (0) which is the lower bit of the first line image data, DATA 1 (1) which is the higher bit of the first line image data, DATA 2 (0) which is the second line image data, DATA 2(1) which is the second line image data, DATA 3 (0) which is the third line image data, DATA 3 (1) which is the third line image data, . . . , DATA 5 (0) which is the fifth line image data, and DATA 5 (1) which is the fifth line image data, are successively written. Then, when these 5 line image data are read out from the sub-scanning correction memory 206, by controlling the read out start position in the sub-scanning direction or the read out timing, the inclination in the sub-scanning direction of the image is corrected as described above.

As described above, the number of lines which can be stored in the sub-scanning correction memory 206 of the same capacity, is different corresponding to the number of gradations. In this manner, by changing the number of lines, the sub-scanning correction memory 206 can be effectively used.

As described above, when the number of lines to be stored in the sub-scanning correction memory 206 is determined from the capacity of the sub-scanning correction memory 206 and the number of gradations of the image data, the capacity which the sub-scanning correction memory 206 has, can be effectively used. Further, the memory capacity of the sub-scanning correction memory 206 may be determined from the number of gradations of the image data and the number of lines necessary for correction.

FIGS. 7(a) to 7(f) are illustrations typically showing the condition of the correction by the inclination correction means 204 when the image data is inclined in the counter-clockwise direction. Incidentally, in the following description, "reference line" means the first line in the main scanning direction (X axis), in the image position when the image formation is conducted, and in the sub-scanning direction (Y axis), it means the line of the first pixel.

Further, "offset movement" means that the offset amount is moved to the reference position at which the image formation is conducted, to the position of the image after inclination correction. Incidentally, in the following embodiment, the inclination correction and the offset correction are simultaneously conducted, by the control of the timing at which the image data is read out from the memory.

Figure 7A:
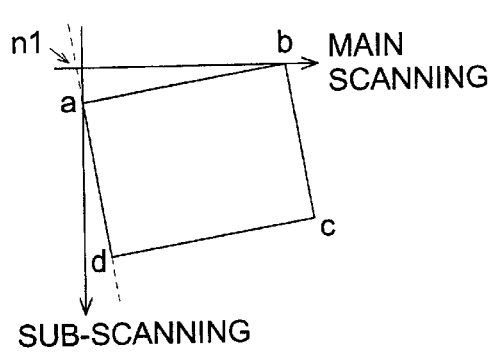
FIGS. 7(a) to 7(f) are illustrations typically showing a condition of the correction by an inclination correction means when the image data is inclined, in the embodiment of the present invention.

FIG. 7(a) shows a case where end points a and b of the image data exist on the reference line (X axis) in the main scanning direction and the reference line (Y axis) in the sub-scanning direction. Herein, a point n1 which exists on the extended line of a and d and crosses with the reference line in the main scanning direction, is used as the reference, and the correction in the main scanning direction is conducted.

Incidentally, herein, "n1 is used as the reference" means that each line is written from n1 pixels, and correction is conducted at the time of reading out. At this time, the offset amount for 1 pixel is also added to the reading out timing, and the image data is offset-moved from n1 to the reference position. Also in the correction of the second and subsequent line, the image data is read out from the position to which the offset amount for n1 pixel is added.

Figure 7B:
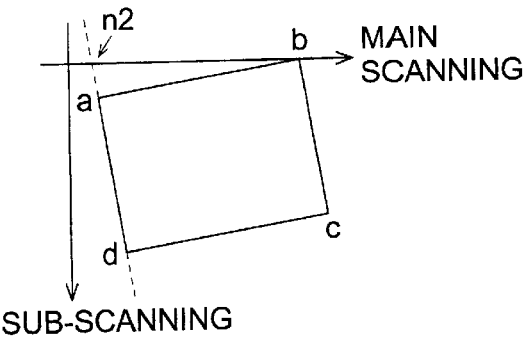
Figure 7C:
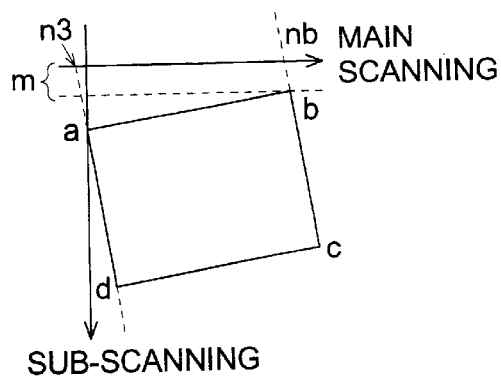
Figure 7D:
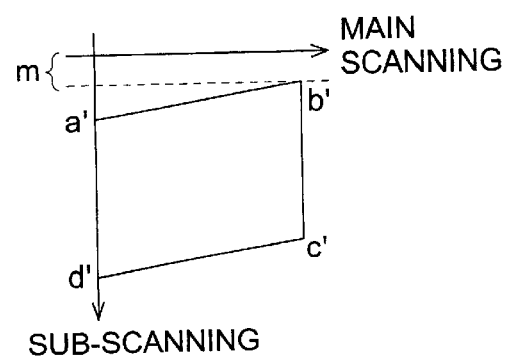
Figure 7E:
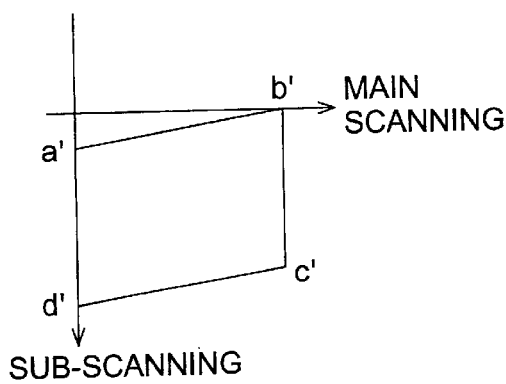
Figure 7F:
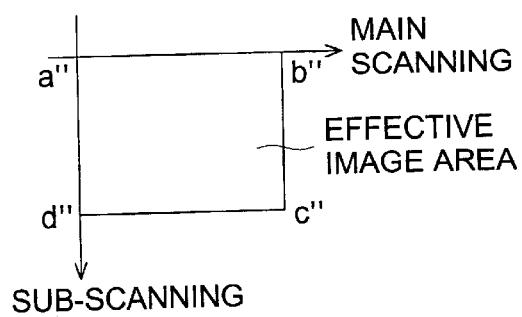

By this offset movement, the image data comes to a condition that the correction in the main scanning direction is conducted as shown in FIG. 7(e). Further, when the correction in the sub-scanning direction is conducted from a' line to b' line, the image data as shown in FIG. 7(f) can be obtained.

FIG. 7(b) is the image data in a condition that the figure in FIG. 7(a) is shifted in the main scanning direction, and shows a case where the end point b of the image data exists on the reference line (X axis) in the main scanning direction. Herein, the correction in the main scanning direction is conducted, by using the point n2 which exists on the extended line of a and d, and crosses with the reference line in the main scanning direction, as the reference.

That is, the correction in the main scanning direction is conducted in such a manner that the image data is written into the memory from the n2 position, and when it is read out, the reading out is conducted from the reference position from which the offset amount for n2 pixels is subtracted, and also for the second and subsequent lines, by subtracting the offset amount for n2 pixels, the image data is offset-moved from n2 to the reference position.

By this offset movement, the image data comes to a condition that the correction in the main scanning is conducted as shown in FIG. 7(e). Further, when the correction is conducted in the sub-scanning direction, the image data as shown in FIG. 7(f) can be obtained.

FIG. 7(c) is the image data in the condition that the figure in FIG. 7(a) is shifted in the sub-scanning direction, and is the case where the end point a of the image data exists on the reference line in the sub-scanning direction (Y axis). Herein, the correction in the main scanning direction is conducted by using the point n3 which exists on the extended line of a and d, and crosses with the reference line in the sub-scanning direction, as the reference. That is, the image data is offset-moved from this n3 to the reference position. By this offset movement, the image data comes to a condition that the correction in the main scanning direction is conducted as shown in FIG. 7(d). The image data in FIG. 7(d) is corrected in the sub-scanning direction, and when the m and subsequent lines are made an effective area, the image data as shown in FIG. 7(f) is obtained.

In the case as described above, an area in which the image formation is actually conducted on the read out image in this image area, is the effective image area.

That is, when the inclination correction of the image data accompanied by-such the offset correction is conducted, the setting of the effective image area to conduct the actual image formation when the inclination correction is conducted, can be optimum, and thereby, the image can be properly corrected.

Further, although not shown here, for the image data which is inclined under the condition that it is shifted in both the main scanning direction and sub-scanning direction, the correction corresponding to both FIG. 7(b) and FIG. 7(c) may be conducted together.

Figure 8A:
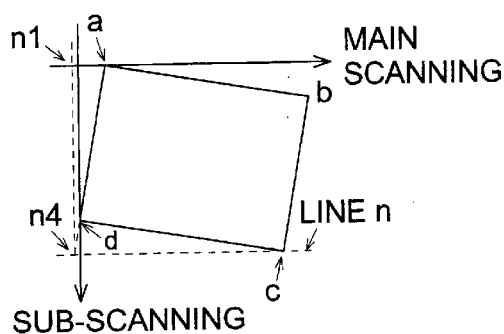
FIGS. 8(a) to 8(f) are illustrations typically showing a condition of the correction by the inclination correction means when the image data is inclined, in the embodiment of the present invention.

FIGS. 8(a) to 8(f) are illustrations typically showing a condition of the correction by the inclination correction means 204 when the image data is inclined clockwise. FIG. 8(a) is a case where the end points a and b of the image data exist on the reference line (X axis) in the main scanning direction and the reference line (Y axis) in the sub-scanning direction. Herein, when the n-th line of the end point c is defined as the line n, the correction in the main scanning direction is conducted by using the n1-th pixel which exists on the extended line of a and d, and crosses with the line n, as the reference.

Herein, the correction in the main scanning direction may be conducted in such a manner that the image data is written into a memory from the position of the n1-th pixel, and when it is read out, the image data is read from the reference position to which the offset amount for n1 pixels is added. Also for the second and subsequent lines, the offset amount for n1 pixels may be added. In such the manner, the image data is offset-moved from this n1 to the reference position. By this offset movement, the image data comes to a condition that the correction in the main scanning direction is conducted as shown in FIG. 8(e). Further, when the correction is conducted in the sub-scanning direction, the image data as shown in FIG. 8(f) is obtained.

Figure 8B:
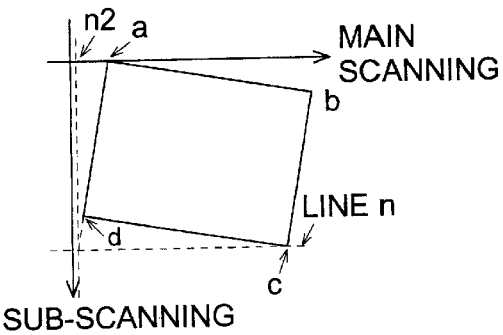

FIG. 8(b) is the image data under the condition that the figure in FIG. 8(a) is shifted in the main scanning direction, and is a case where the end point a of the image data exists on the reference line (X axis) in the main scanning direction. Herein, the correction in the main scanning direction is conducted by using the n2-th pixel which exists on the extended line of a and d, and crosses with the line n, as the reference.

Herein, the correction in the main scanning direction may be conducted in such a manner that the image data is written into a memory from the position of the n2-th pixel, and when it is read out, the image data is read from the reference position from which the offset amount for n2 pixels is subtracted. Also for the second and subsequent lines, the offset amount for n2 pixels may be subtracted. In such the manner, the image data is offset-moved from this n2 to the reference position. By this offset movement, the image data comes to a condition that the correction in the main scanning direction is conducted as shown in FIG. 8(e). Further, when the correction is conducted in the sub-scanning direction, the image data as shown in FIG. 8(f) is obtained.

Figure 8C:
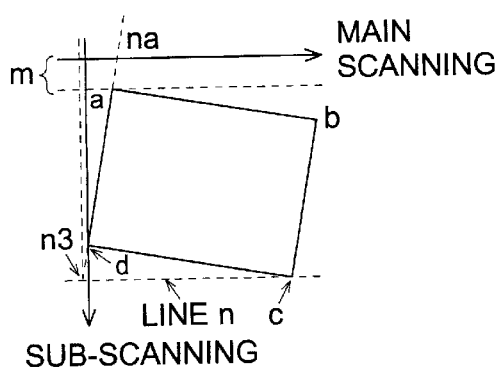

FIG. 8(c) is the image data under the condition that the figure in FIG. 8(a) is shifted in the sub-scanning direction, and is a case where the end point d of the image data exists on the reference line (Y axis) in the sub-scanning direction. Herein, the correction in the main scanning direction is conducted by using the n3-th pixel which exists on the extended line of a and d, and crosses with the line n, as the reference.

Figure 8D:
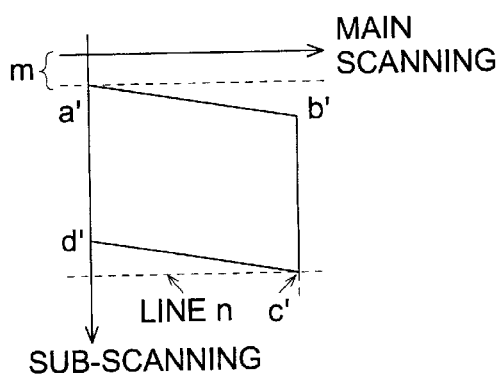
Figure 8E:
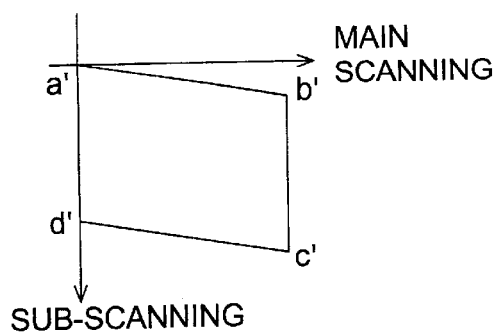
Figure 8F:
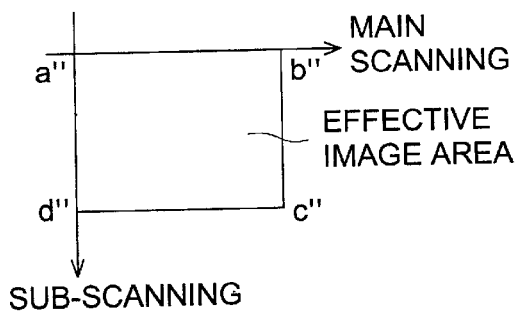

Herein, the correction in the main scanning direction may be conducted in such a manner that the image data is written into a memory from the position of the n3-th pixel, and when it is read out, the image data is read from the reference position to which the offset amount for n3 pixels is added. Also for the second and subsequent lines, the offset amount for n3 pixels may be added. In such the manner, the image data is offset-moved from this n3 to the reference position. By this offset movement, the image data comes to a condition that the correction in the main scanning direction is conducted as shown in FIG. 8(d). Further, when the image data in FIG. 8(d) is corrected in the sub-scanning direction, and the m-th and subsequent lines are made the effective image area, the image data as shown in FIG. 8(f) is obtained.

That is, when the inclination correction of the image data accompanied by such the offset correction is conducted, the setting of the effective image area to conduct the actual image formation when the inclination correction is conducted, can be optimum, and thereby, the image can be properly corrected.

Further, although not shown here, for the image data which is inclined under the condition that it is shifted in both the main scanning direction and sub-scanning direction, the correction corresponding to both FIG. 8(b) and FIG. 8(c) may be conducted together.

Incidentally, in the above embodiment, when the inclination amount from the inclination detecting means 203 exceeds the maximum correction amount of the inclination correction means 204, it is preferable that the correction is conducted by using the maximum correction amount as the inclination amount. According to this, the inclination correction can be conducted without interrupting the operation. Incidentally, when the detected inclination amount exceeds the allowable inclination amount in the image quality (a slight inclination amount within an amount in which the inclination is visually sensed) in addition to the maximum correction amount, it is preferable to display that the inclination of the document exceeds the correction amount.

As detailed above, in the present invention, the inclination of the image data is detected; the shift in the main scanning direction is corrected by changing the reading out timing when the image data for one line is read out, corresponding to the inclination; the image data not smaller than 2 lines is stored; and the sub-scanning direction line position when the image data is read out, is changed corresponding to the detected inclination; thereby, the shift in the sub-scanning direction is corrected.

Accordingly, the memory for one line for the main scanning direction, and the memory for n lines (n is an integer not smaller than 2) for the sub-scanning direction are necessary, and thereby, the line memory for (1+n) lines is sufficient. Further, because the processing is basically the processing for each line, and the inclination correction can be conducted while reading out the image data, therefore, the almost real time inclination correction processing can be conducted. As the result, the image processing method and the image forming apparatus in which the large capacity memory for the inclination correction is not necessary, and the inclination correction can be conducted in a short time, can be realized.

What is claimed is:

1. An image processing apparatus comprising:
   (a) an inclination detecting device for detecting an inclination of image data which is a set of linearly arranged pixels;
   (b) a main scanning correction device for storing image data for a one line image into a first memory, and for correcting a shift of the one line image in a main scanning direction by changing a reading timing of the one line image when the image data is read from the first memory, according to the detected inclination; and
   (c) a sub-scanning correction device for storing image data for n line images into a second memory, wherein n represents an integer not smaller than 2, and for correcting a shift of each of the n line images in a sub-scanning direction by changing a reading line position of each of the n line images in the sub-scanning direction when the image data is read from the second memory, according to the detected inclinations;
   wherein the sub-scanning correction device changes a number of line images which is written in the sub-scanning correction device, according to a number of gradations of the image data; and
   wherein when an inclination amount detected by the inclination detecting device exceeds a maximum correction amount of the main scanning correction device or the sub-scanning correction device, the maximum correction amount is used as the inclination amount.

2. An image reading apparatus comprising:
   (a) an image reading device for reading an image of a document;
   (b) an image input device for receiving image data read by the image reading device;
   (c) a detecting device for detecting an inclination of the image data which is a set of linearly arranged pixels;
   (d) a main scanning correction device for storing image data for a one line image in a first memory, and for correcting a shift of the one line image in a main scanning direction, by changing a reading timing of the one line image when the image data is read from the first memory, according to the inclination detected by the detecting device;
   (e) a sub-scanning correction device for storing image data for n line images in which n represents an integer not smaller than 2, into a second memory, and for correcting a shift of each of the n line images in a sub-scanning direction, by changing a reading line position of each of the n line images in the sub-scanning direction when the image data is read from the second memory, according to the inclination detected by the detecting device;
   (f) an image storing device for storing image data corrected by the main scanning correction device and the sub-scanning correction device; and
   (g) a controller for controlling operations of the image input device, the detecting device, the main scanning correction device, and the sub-scanning correction devices;
   wherein the sub-scanning correction device changes a number of line images which is written in the sub-scanning correction device, according to a number of gradations of the image data; and
   wherein when an inclination amount detected by the inclination detecting device exceeds a maximum correction amount of the main scanning correction device or the sub-scanning correction device, the maximum correction amount is used as the inclination amount.

3. An image forming apparatus comprising:
   (a) an image input device for receiving image data;
   (b) a detecting device for detecting an inclination of the image data which is a set of linearly arranged pixels;
   (c) a main scanning correction device for storing image data for a one line image in a first memory and for correcting a shift of the one line image in a main scanning direction, by changing a reading timing of the one line image when the image data is read from the first memory, according to the inclination detected by the detecting device;
   (d) a sub-scanning correction device for storing image data for n line images in which n represents an integer not smaller than 2, in a second memory, and for correcting a shift of each of the n line images in a sub-scanning direction, by changing a reading line position of each of the n line images in the sub-scanning direction when the image data is read from the second memory, according to the inclination detected by the detecting device;
   (e) an image storing device for storing image data corrected by the main scanning correction device and the sub-scanning correction device;
   (f) a controller for controlling operations of the image input device, the detecting device, the main scanning correction device, and the sub-scanning correction device; and
   (g) an image forming device for forming an image based on the image data stored in the image storing devices;
   wherein the sub-scanning correction device changes a number of line images which is written in the sub-scanning correction device, according to a number of gradations of the image data; and
   wherein when an inclination amount detected by the inclination detecting device exceeds a maximum correction amount of the main scanning correction device or the sub-scanning correction device, the maximum correction amount is used as the inclination amount.

* * * * *